United States Patent
Lucas et al.

(10) Patent No.: US 6,625,962 B1
(45) Date of Patent: Sep. 30, 2003

(54) DRAWING FRAME FOR PLASTIC SHEATH AND MACHINE COMPRISING SAME

(75) Inventors: Gerard Lucas, La Verrie (FR); Jean-Claude Retaillaud, La Verrie (FR)

(73) Assignee: Lucas G, La Verrie (FR)

( * ) Notice: Subject to any disclaimer, the term of this patent is extended or adjusted under 35 U.S.C. 154(b) by 0 days.

(21) Appl. No.: 09/530,425

(22) PCT Filed: Oct. 29, 1998

(86) PCT No.: PCT/FR98/02323

§ 371 (c)(1),
(2), (4) Date: Jul. 10, 2000

(87) PCT Pub. No.: WO99/22584

PCT Pub. Date: May 14, 1999

(30) Foreign Application Priority Data

Oct. 30, 1997 (FR) .............................................. 97 13884
Aug. 11, 1998 (FR) .............................................. 98 10362

(51) Int. Cl.[7] .............................................. B65B 9/10
(52) U.S. Cl. ........................... 53/567; 53/576; 141/314; 141/316
(58) Field of Search ................................ 53/576, 384.1, 53/567, 570, 218, 585, 575, 469; 141/314, 313, 316, 114, 10

(56) References Cited

U.S. PATENT DOCUMENTS

| 1,254,371 | A | * | 1/1918 | Smith ........................ 248/101 |
| 3,750,721 | A | * | 8/1973 | Hudson ....................... 141/10 |
| 5,385,002 | A | | 1/1995 | Cundall |
| 5,421,144 | A | * | 6/1995 | Inman et al. ................. 53/567 |
| 5,465,559 | A | * | 11/1995 | Heiner et al. ................. 53/567 |
| 5,619,839 | A | | 4/1997 | Peppard et al. |
| 5,628,168 | A | * | 5/1997 | Inman et al. ................. 53/567 |
| 5,692,363 | A | * | 12/1997 | Inman et al. ................. 53/567 |
| 5,724,793 | A | * | 3/1998 | Inman et al. ................. 53/567 |

FOREIGN PATENT DOCUMENTS

| EP | 0 789 993 | 8/1997 |
| GB | 2 227 220 | 7/1990 |

* cited by examiner

Primary Examiner—Stephen F. Gerrity
Assistant Examiner—John Paradiso
(74) Attorney, Agent, or Firm—Young & Thompson

(57) ABSTRACT

A drawing frame comprising, starting from a main frame (1), a sliding frame consisting of several actuators (20, 22, 23) arranged in a straight position on the elements drawing the sheath (5). The various actuators (20, 22, 23) are guided by slide rails (13, 14) and in particular by a pair of dihedral structures (7) for example, comprising beams (10, 12) and slides mobile by the effect of the various actuators. The drawing frame can advantageously be installed on a machine used for making silos, for sheathing fodder bales for example.

12 Claims, 4 Drawing Sheets

DRAWING FRAME FOR PLASTIC SHEATH AND MACHINE COMPRISING SAME

CROSS REFERENCE TO RELATED APPLICATION

This is the 35 USC 371 national stage of international application PCT/FR98/02323, filed on Oct. 29, 1998, which designated the United States of America.

FIELD OF THE INVENTION

This invention concerns a drawing frame for sheath made of plastic material such as shape-memory polyethylene, with high elastic deformation.

This drawing frame can be used for instance on a sheathing machine and in particular a machine for making silos, with bales of plants, fodder or other.

BACKGROUND OF THE INVENTION

This type of machine such as that described notably in the document U.S. Pat. No. 5,220,772 for round bales or EP-0 789 993 for parallelepipedic bales, comprises generally an appropriate polygonal frame, associated with a main frame whose size is such that it enables the passage of the fodder bale. This frame comprises extenders consisting—of cantilever supports on which the plastic sheath is stored and—of actuators moving said supports radially in order to increase the perimeter of said sheath sufficiently to be able to insert the bales inside said sheath. The sheath is pulled down around said bales as they are produced, thereby forming a kind of sausage.

In view of the radial arrangement of the extenders, the machines of this type are particularly cumbersome and, due to the presence of an immovable polygonal frame, they are not suitable for bales of different gauges.

SUMMARY OF THE INVENTION

According to the invention, the sheath is stored on supports mounted on throated arms, whereas said supports are arranged and/or guided with respect to a fixed main frame in order to form a polygonal mouth piece and whereby one of these supports is mobile, subject to displacement means that cause the perimeter of the sheath to expand at said mouthpiece, whereas said displacement means consist of actuators arranged in a straight position on each mobile support and, some of them, on the main frame, whatever the shape of said mouth piece.

According to a preferred embodiment of the invention, the main frame takes the form of a horizontal beam comprising, on the one hand, arranged symmetrically with respect to the vertical plane of the polygon delineated by the sheath—fixed supports integral with said beam and,—two lateral structures, articulated on said horizontal beam, close to the fixed supports, and on which structures the mobile support(s) is(are) guided and, on the other hand, actuators forming, around the mouthpiece, a closed frame on said beam, arranged in a straight position on one another, starting from said beam and on the mobile support(s).

Still according to the invention, in the case of a drawing frame for round bales, each lateral structure has for instance the shape of a dihedron, consisting of two beams forming slide rails that delineate an angle of approx. 120° in the case of a mouthpiece and of a hexagonal frame:—a first beam articulated at one of its ends on the horizontal beam of the main frame close to each fixed support,—a second beam mounted to run at one of its ends on the first beam, comprising a mobile support situated on the bisecting plane of the angle delineated by said first and second beams,—a slide at the end of the second beam comprising another mobile support.

Still according to a preferred embodiment of the invention, the hexagonal frame consists—of two lateral dihedral structures and of two actuators in each dihedron,—with the addition of an actuator extending between the ends of two lateral structures, at their upper section, interposed between the slides arranged at the ends of the second beams of said structures and—of the horizontal beam of the main frame that serves as a sixth side.

In the case of square bales, the drawing frame according to the invention comprises lateral structures in the form of single beams articulated on either side of the fixed lower supports, on the horizontal beam of the main frame, whereas each beam serves as a guide for a slide that is fitted with a sheath support, whereby said slides are interconnected by a horizontal actuator and are connected to the main frame each by an actuator and the frame consists therefore: of said horizontal beam, of the lateral beams and of the horizontal upper actuator.

Still according to the invention, the lateral structures of the drawing frame are interconnected by a kind of rudder bar that maintains each of them in such a position that they are constantly symmetrical with respect to one another and with respect to the middle vertical plane going through the longitudinal axis of the drawing frame, i.e. the insertion axis of the bales; said rudder bar has the shape of a transversal axle guided on the main frame of the drawing frame and fitted at its lateral ends with arms parallel to one another and whose end of each is integral, using an appropriate link, with the corresponding lateral structure.

According to another embodiment of the invention, the supports of the plastic sheath are mounted on throated arms in order to place the stored sheath on the plane of the actuators and of the slide rails, whereby each arm is integral with a slide or with the main frame and whereby each support comprises a fixed pallet in the form of a cylindrical section.

The invention also concerns a sheathing machine for bales of plants, that comprises a drawing frame such as described previously and a hydraulic control station of the various actuators that are power supplied from a stand-alone plant or from a plant arranged on a farming vehicle such as a tractor.

This drawing frame may for instance be used on a stand-alone sheathing machine, i.e. fitted with its own pusher as described in the document CA-2 111 546, as well as on a simpler machine for which the bales are pushed directly by the loading vehicle.

Still according to the invention, this machine comprises a main frame mounted on transport wheels and this main frame also comprises, on the silo side, i.e. of the sheathed bales, girders fitted with pad-shaped members and/or suitable wheels according to the nature of the soil, and possibly fitted with spades that maintain the machine in position and prevent it from reversing as the bales are inserted into the mouthpiece of the sheath.

According to another arrangement of the invention, the anchoring points of the handling actuators are multiple, so that the size of the mouthpiece and of the frame can be adapted easily to the gauge of the bales to be sheathed.

BRIEF DESCRIPTION OF THE DRAWINGS

The invention will be detailed further using the following description and the appended drawings, given for exemplification purposes and in which.

DETAILED DESCRIPTION OF THE INVENTION

Figure 2:
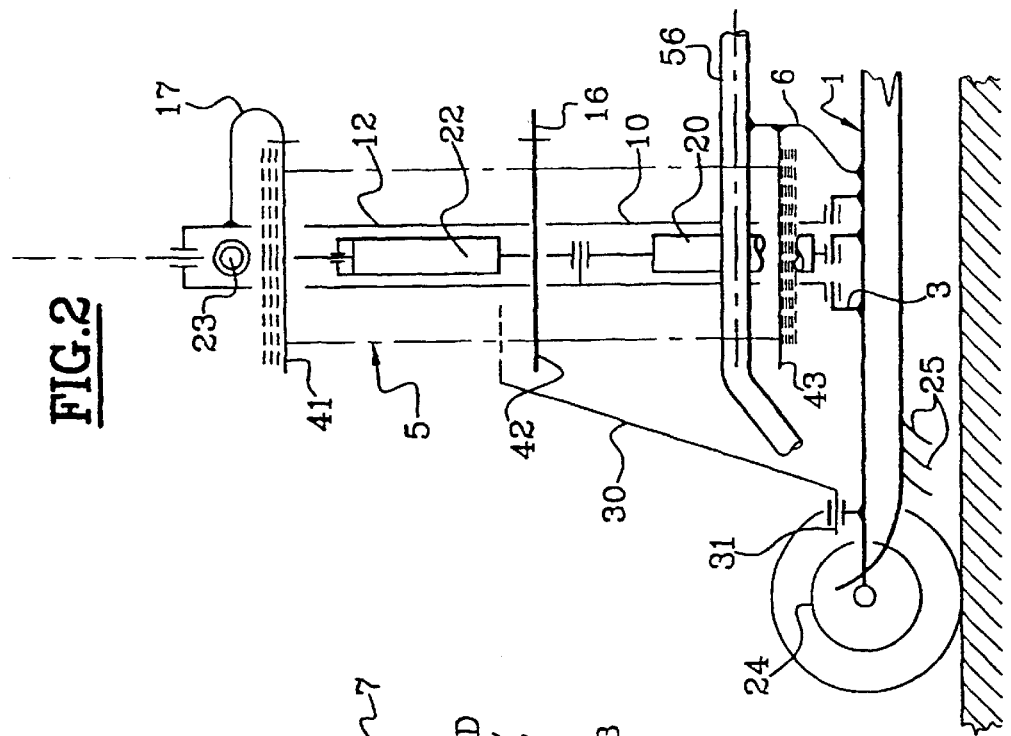
FIG. 2 is a schematic view along 2—2 of FIG. 1.
Figure 1:
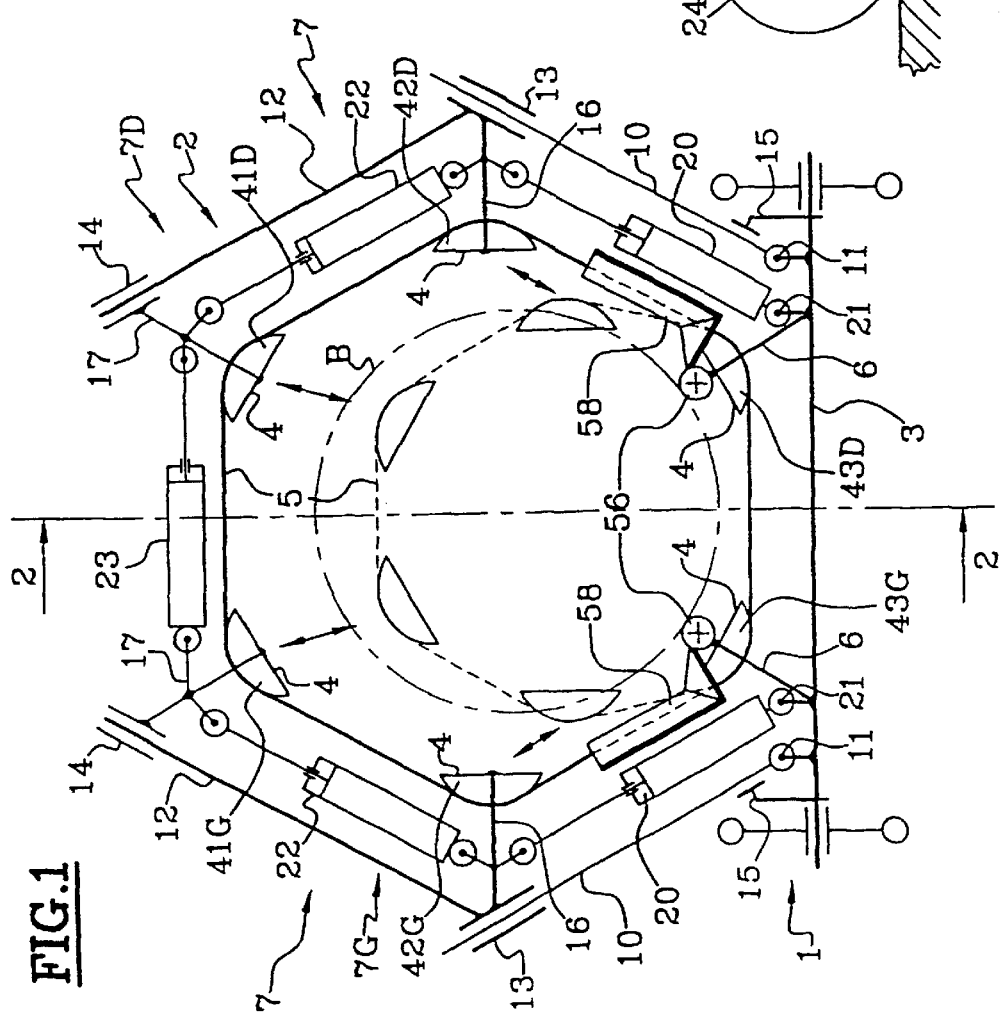
FIG. 1 is a schematic front view of the drawing frame according to the invention, for sheathing round bales.

The drawing frame represented schematically on FIGS. 1 and 2 comprises a main frame 1 mounted for instance on wheels, whereas said main frame carries a deployable frame 2 extending from the horizontal transversal beam 3 of said main frame, on a plane that is vertical and perpendicular to the direction of introduction of the bales 'B' into said frame for sheathing said bales.

Sheathing takes place using a sheath made of plastic material such as shape-memory stretchable polyethylene, i.e. with elastic deformation. This sheath is stored on supports 4, distributed in the angles of a polygon; it is for instance arranged in superimposed layers forming a tube with quasi-hexagonal cross-section. This type of sheath 5 sustains at least 30% elastic stretching.

Drawing the sheath 5 thus stored consists of radial displacement of the supports 4 and in particular, in the embodiment of FIG. 1, of the displacement of four of the supports 4: the upper supports 41, one situated on the right (41D) and the other on the left (41G) and the intermediate lateral supports 42D and 42G. The lower supports 43D and 43G are fixed; they are integral with the horizontal beam 3 of the main frame 1, by means of the arms 6.

All the supports 4 are arranged symmetrically with respect to the middle vertical plane of the main frame 1.

The hexagonal frame 2 comprises in its lower section a side formed by the horizontal beam 3 of the main frame 1. It also comprises a pair of dihedral lateral structures 7 that serve as slide rails. These structures 7D and 7G are formed by a first beam 10 articulated at one of its ends around an axle 11 on the beam 3 of the main frame 1, and by a second beam 12 that is mounted to run at one of its ends on said first beam 10, using a slide 13. The apex angle of the dihedron is approx. 120° in the example of FIG. 1.

There is a slide 14 at the end of the second beam 12.

The movement of the first beam 10 around its axle 11 is for example limited by stops 15 that are integral with the main frame 1 and situated on either side of said beams 10; other means will also be detailed below in relation to FIG. 5.

The support 42 (D and G) is integral with the second beam 12 and in particular its slide 13 using a radial arm 16. This arm 16 is situated more or less on the middle plane of the dihedron formed by the structures 7.

The support 41 (D and G) is integral with the slide 14 using a radial arm 17 that is situated on a plane that delineates an angle of approx. 60° with the second beam 12.

The movement of the different supports 41G, 42G and their counterparts 41D and 42D, is provided by actuators arranged in a straight position on the one hand, on the arms 16 and 17 that carry respectively said supports 41 and 42 and, on the other hand, on the beam 3.

There is a first actuator 20 parallel to the first beam 10; this actuator is articulated around an axle 21 from the beam 3 of the main frame 1. After this actuator 20, there is a second actuator 22. Both these actuators 20 and 22 are integral with the arm 16 that carries the support 42 and they form together an angle similar to that of the dihedron formed by each structure 7. The actuator 22 is also integral with the arm 17 that carries the support 41. The arms 17 mounted on the slides 14 of the dihedrons 7D and G, are interconnected by an actuator 23 that extends horizontally above the main frame 1.

The actuators 22 and 23 are arranged in a straight position on each arm 17, on the right and on the left.

The different actuators 20, 22 situated on the right and on the left and the upper actuator 23 form a polygonal loop that is closed on the beam 3. Such an assembly provides better balance of the loads when the sheath 5 is extended by the supports 4, and formation of a mouthpiece with regular shape, a shape that is established once the actuators have reached the end of their travel and are locked in that position.

These actuators are power-supplied from a control station that is not represented, which comprises either a stand-alone hydraulic power plant or an appropriate link that is connected to the hydraulic unit of a farming tractor.

The drawing operation takes place once and for all after the sheath has been placed on the supports 4. The supports 41, 42, 43 are held in spread position by the actuators 20, 22, 23 until the sheath 5 has been reeled completely. During the sheathing operation, the drawing frame is totally passive; the various actuators are pressurised, blocked and the supports 41, 42 are in extended position, locked by said actuators.

FIG. 2 shows schematically the main frame 1 carried by pads or wheels 24 with, possibly, spades 25 serving as a reverse-locking device. Each lower support 43 is integral with the transversal beam 3 of the main frame 1. It is topped with the support 42 arranged halfway up the frame and the support 41, both situated in the upper section. The different supports 43, 42, 41 are carried respectively by throated arms 6, 16 and 17 to enable installation and storage of the sheath 5. These throated assemblies will be detailed below in relation to FIG. 7.

Still on FIG. 2, we can see the first beam 10 articulated on the beam 3 of the main frame 1, and the second beam 12.

The first beam 10 can be associated with a stiffener 30 that extends from the upper end of said beam, up to an articulation axle 31 arranged on the main frame 1. This stiffener 30 enables stiffening the drawing frame and limiting the deflection of its upper section, notably when unreeling the sheath 5.

We also find, on the same transversal plane as that of the beams 10 and 12, the actuators 20, 22 and 23.

Figure 3:
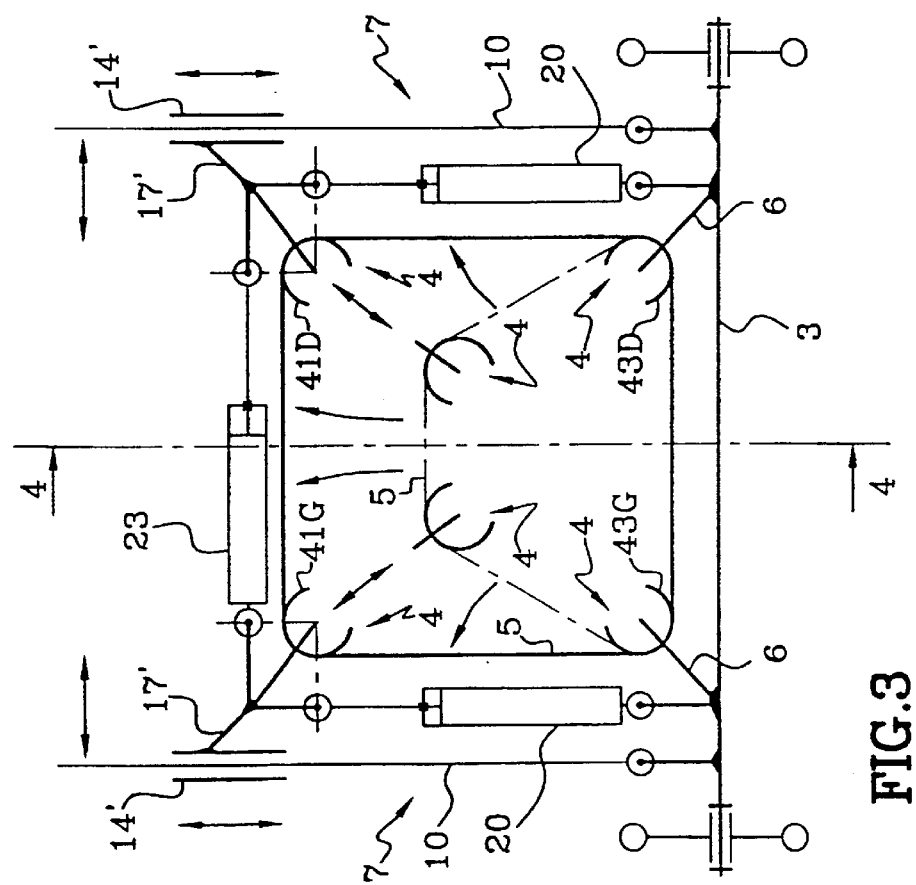
FIG. 3 is a schematic front view of the drawing frame according to the invention for parallelepiped bales.

FIG. 3 shows an embodiment variation of the drawing frame, more particularly suitable for sheathing bales in the form a rectangular parallelepiped whose cross-section is square or rectangular.

This drawing frame demonstrates the same technology as that developed on FIG. 1 for round bales. For this drawing frame, the lateral structures 7 simply consist of beams 10 forming slide rails for slides 14'. The slides 14' are interconnected at their upper section by means of an actuator 23 and they are connected to the beam 3 of the main frame 1 by means of lateral actuators 20.

The sheath 5 is arranged on supports 4 as previously: upper supports 41D and 41G as well as lower supports 43D and 43G. The supports 41D and 41G are integral with the slides 14' using arms 17'. The supports 43D and 43G are fixed and integral with the transversal beam 3 using arms 6.

In normal extended position, the frame of the drawing frame consists of the lower horizontal beam 3, vertical lateral beams 10 and the upper actuator 23 placed horizontally. The four supports 4 are arranged in the form of a square and stretch the sheath 5 in such a position that it may receive parallelepipedic bales with square cross-section.

Figure 4:
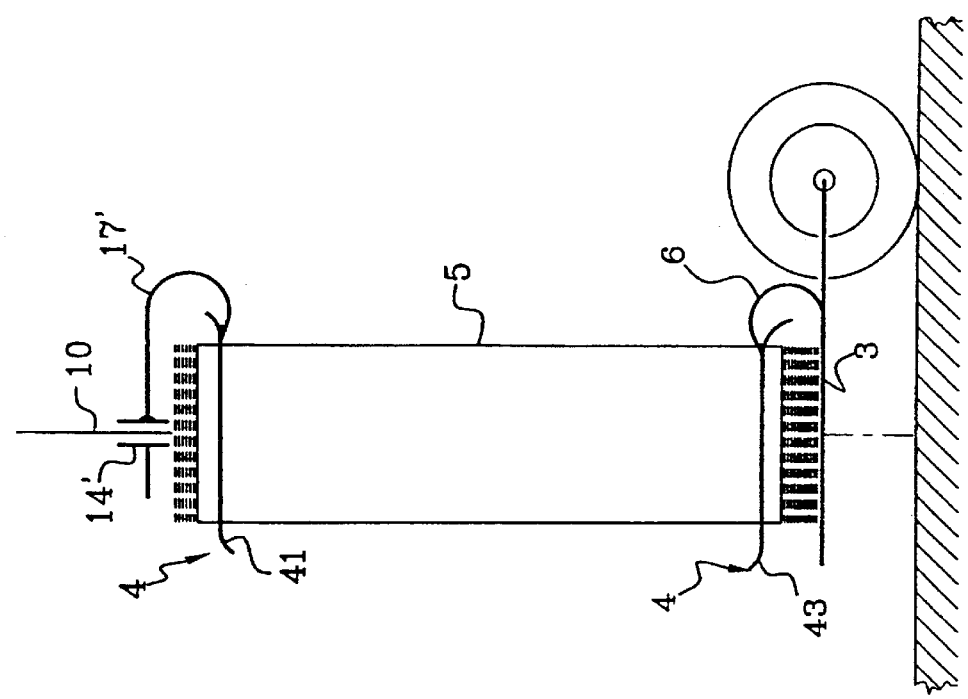
FIG. 4 is a schematic view along 4—4 of FIG. 3.

FIG. 4 shows schematically the drawing frame represented on FIG. 3. We can see the plastic sheath 5 stretched between the supports 4 and in particular the lower 43 and upper 41 supports. The upper supports 41 are integral with the slide 14' that is guided on the lateral beams 10.

Figure 5:
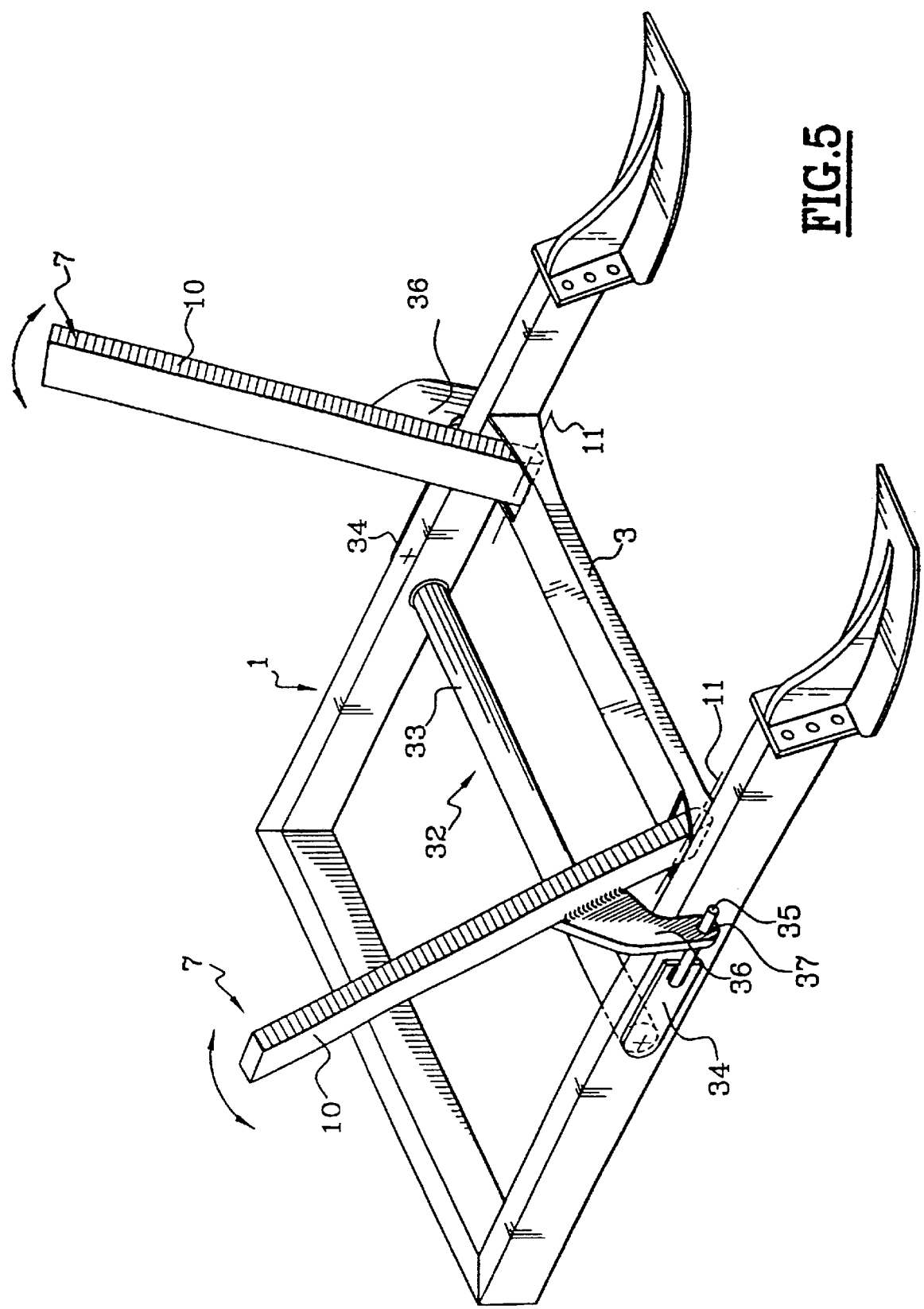
FIG. 5 is a simplified perspective view showing the rudder bar system that enables connecting the lateral structures of the drawing frame in order to hold them in the same position, symmetrically with respect to the middle vertical plane of the drawing frame.

FIG. 5 represents schematically and in a simplified fashion, the main frame 1 of the drawing frame with the beam 3 on which are articulated the lateral structures 7 of the drawing frame according to FIG. 3 or FIG. 1.

The lateral structures 7 consisting notably of the beams 10, are integral with one another by a kind of rudder bar 32 that comprises a transversal axle 33 guided on each side of the main frame 1. This axle 33 comprises at each of its ends, an arm 34 whose end 35 co-operates with plates 36 fixed at the lower end of the beams 10. The end 35 has for instance the shape of an axle and co-operates with a circular orifice 37 provided at the lower end of the plate 36, thereby forming a makeshift articulation.

The arms 34 are made of sheet metal and exhibit certain flexibility in order to tolerate any variation in the centre distance between the orifices 37 when the beams 10 are moving around their articulation axle 11.

Thus, the lateral structures 7 of the drawing frame are interconnected via the rudder bar 32 and keep, permanently, a position that is symmetrical with respect to the vertical, longitudinal and middle plane of the drawing frame in the case of FIG. 1 as well as in the case of FIG. 2.

Figure 6:
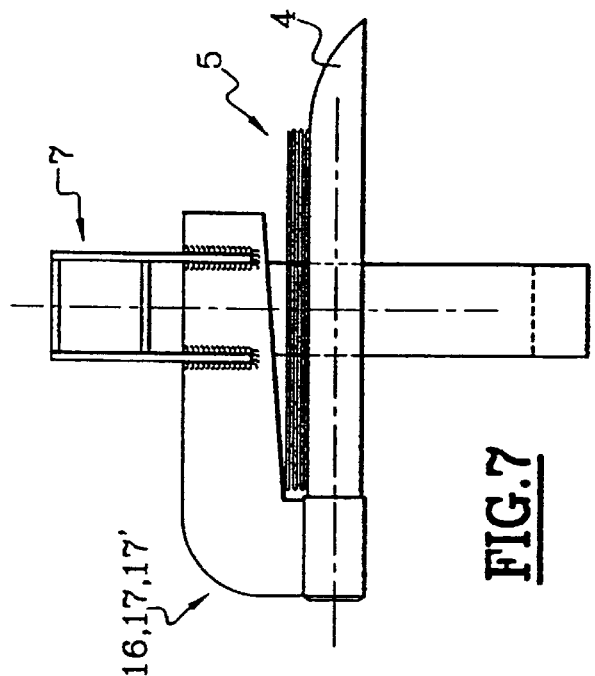
FIG. 6 represents the drawing frame schematically as seen from above.

FIG. 6 shows, as seen schematically from above, the main elements of a sheathing machine. Thus, there are the main frame 1 carried by wheels and the drawing frame of the sheath 5, which sheath is stretched by the supports 4. This machine comprises two slide rails 56, integral with the main frame 1, that serve as guides for the bale intended to run through the drawing frame and to be enveloped by the sheath 5.

In order to avoid any interference between the bale and the plastic sheath 5, additional guides 57 can be arranged halfway up, for instance at the supports 42. The bale can also be centred at its lower section using guides 58 if the form of funnel sections that would advantageously protect the lower section of the sheath 5.

The guides 58 also appear on FIG. 1 and it can be noticed that in normal active position, the sheath 5 is retracted from these guides 58, protected against any contact with the bale B.

Figure 7:
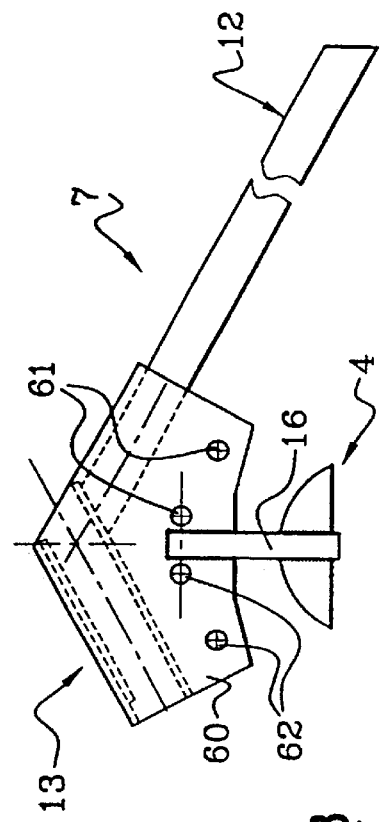
FIG. 7 represents a supporting arm on which the plastic sheath is laid.

FIG. 7 shows a support 4 mounted on a throated arm 16, 17 or 17'. The support 4 has the shape of a cylindrical section whose diameter is approx. 150–250 mm for instance, making up a kind of pallet on which rests the sheath 5. The downstream end of the support 4 is rounded in order not to tear the sheath 5 apart as it is extracted during the sheathing operation.

Figure 8:
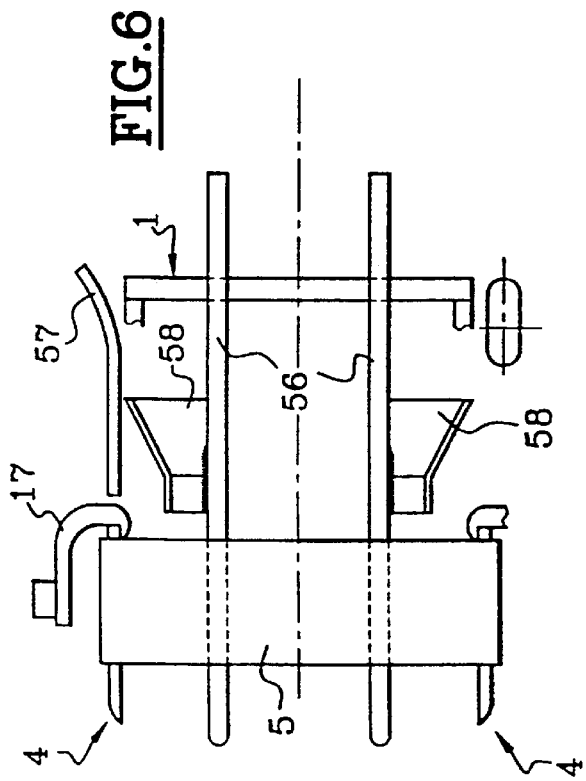
FIG. 8 represents a sliding beam of the drawing frame shown on FIG. 1.

FIG. 8 shows an element of the structure 7. This element of the structure 7 corresponds on the drawing, FIG. 1, to the beam 12, fitted with the slide 13 and on which is fixed the arm 16 that carries the support 4. On the flanges 60 interposed between the beam 12 and the slide 13 and in particular on one flange on which the arm 16 is mounted, we can see the bores 61 and 62 that are used for installing actuators and especially the actuators 20 and 22.

The bores 61, 62, as represented on FIG. 8, are two in number, or more according to the requirements, for each actuator, in order to modify the stroke of the supports 4 and to suit the mouthpiece of the drawing frame easily to the different gauges of bales to be sheathed.

This possibility to anchor the actuators 20, 22, 23 in different positions can be seen on the arms 6, on the slides 13 and 14 of the drawing frame for round bales and on the slides 14' of the drawing frame for parallelepipedic bales.

What is claimed is:

1. A drawing frame for a plastic sheath, which plastic sheath is folded into several superimposed layers, and stored on sheath supports mounted on throated arms, said sheath supports being arranged and guided with respect to a main frame in order to form a polygonal mouthpiece, and some of said sheath supports are mobile, subject to displacement means that cause the perimeter of said sheaths to expand, wherein said displacement means comprise actuators arranged in a straight position between two adjacent mobile supports and for some of them between a mobile support and said main frame.

2. The drawing frame according to claim 1, wherein the main frame is in the form of a horizontal beam, on which are arranged symmetrically with respect to the vertical perpendicular to the horizontal beam and bisecting the polygon delineated by the sheath, fixed supports integral with said main frame, and two lateral structures articulated on said main frame, on which the sheath supports are guided.

3. The drawing frame according to claim 2, wherein the lateral structures comprise two beams forming a dihedron that delineates an angle of about 120°; a first beam articulated on the main frame at one of its ends, and a second beam mounted to run at one of its ends on the first beam, carrying a support situated in the angle delineated by said dihedron; and a slide guided over the whole length of the second beam, carrying another support.

4. The drawing frame according to claim 3, wherein said drawing frame comprises two actuators arranged in each dihedron on either side of an arm that carries the support, and an actuator extending between upper ends of both lateral structures and which adopts a straight position with the actuator of said dihedron on an arm of the slide that carries the support.

5. The drawing frame according to claim 3, wherein each sheath support is mounted on the slides and on the main frame using a throated arm that enables placing a radial middle plane of the stored sheath onto the plane of the lateral structures and of the different actuators and slide rails formed by the beams.

6. The drawing frame according to claim 2, wherein the lateral structures are in the form of single beams articulated on either side of the fixed supports on a beam of the main frame, whereas each lateral beam serves as a guide for a slide that is fitted with a sheath support, whereby said slides are interconnected by a horizontal actuator and are each connected to the main frame by an actuator.

7. The drawing frame according to claim 2, wherein the lateral structures are interconnected by a rudder bar that links and maintains each of the lateral structures in such a position that they are constantly symmetrical with respect to one another and with respect to a middle vertical plane going through the longitudinal axis of the drawing frame; said rudder bar having the shape of a transversal axle guided on the main frame, which axle is fitted at its lateral ends with arms parallel to one another whose end of each is integral, using an appropriate link, with the corresponding lateral structure.

8. The drawing frame according to claim 1, wherein each sheath support comprises a cylindrical section whose diameter is about 150–250 mm; said envelope forming a pallet terminated by a round section.

9. The drawing frame of claim 1, wherein the actuators are arranged in parallel with a corresponding edge of the formed polygonal mouthpiece.

10. A sheathing machine for bales of plants, for making a longitudinal silo, said machine comprising a drawing frame for a plastic sheath, which plastic sheath is folded into several superimposed layers, and stored on sheath supports mounted on throated arms, said sheath supports being arranged and guided with respect to a main frame in order to form a polygonal mouthpiece, and at least one of said sheath supports is mobile, subject to displacement means that cause the perimeter of said sheath to expand, wherein said displacement means comprise actuators arranged in a position on each mobile support that is parallel with a corresponding edge of the formed polygonal mouthpiece and for some of them on said main frame; and a hydraulic control station of the different actuators that are power-supplied from a stand-alone plant or from a plant onboard a vehicle.

11. The sheathing machine according to claim 10, wherein the main frame is connected to transport wheels and comprises on a silo side, pads or wheels, and spades for preventing said machine from reversing, whereby said wheels assist in displacing the machine during a sheathing operation.

12. The sheathing machine according to claim 10, wherein the actuators comprise multiple anchoring points so that the size of the mouth piece and of the frame can be adapted easily to the gauge of the bales to be sheathed.

* * * * *